217. WOODEN RECEPTACLES,
Bent, Angular.
BEST AVAILABLE COPY
2 Sheets--Sheet 1.
CHARLES L. TUCKER.
Improvement in Packages for Lard.
No. 4,369. Reissued May 2, 1871.
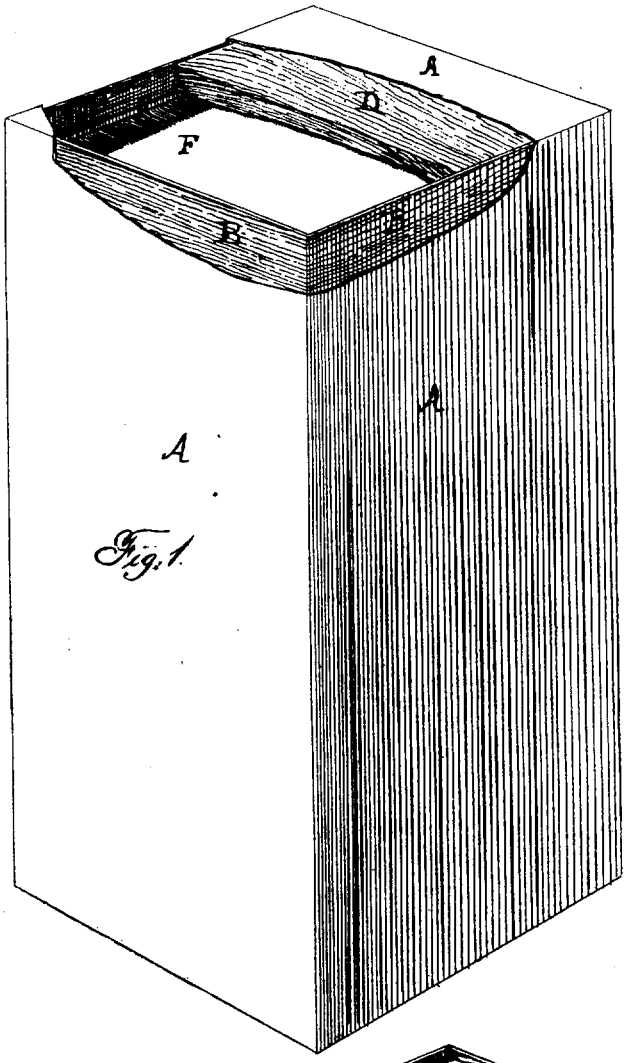
Fig. 1
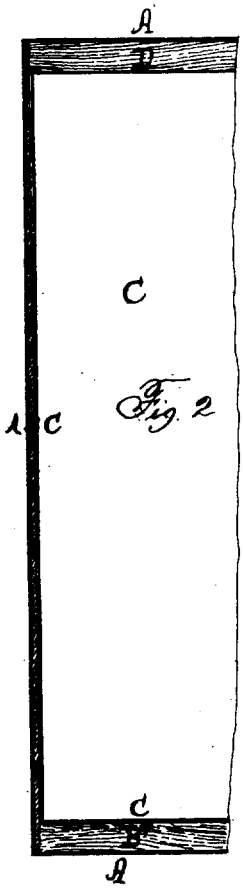
Fig. 2
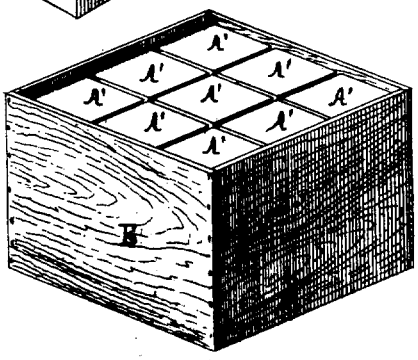
Fig. 3,
Witnesses
L. L. Bond
John Tyler
Charles L. Tucker Inventor.
A.H. PHOTO-LITHOGRAPHIC CO. N.Y. (BUNNETT'S PROCESS)

217. WOODEN RECEPTACLES,
Bent, Angular.

2.

CHARLES L. TUCKER. 2 Sheets--Sheet 2.

Improvement in Packages for Lard.

No. 4,369. Reissued May 2, 1871.

L. L. Bond
John Foster

Charles L. Tucker

AM. PHOTO-LITHOGRAPHIC CO. N.Y. (OSBORNE'S PROCESS.)

UNITED STATES PATENT OFFICE.

CHARLES L. TUCKER, OF CHICAGO, ILLINOIS.

IMPROVEMENT IN PACKAGES FOR LARD.

Specification forming part of Letters Patent No. 66,268, dated July 2, 1867; reissue Nos. 3,037 and 3,038, dated July 14, 1868; reissue No. 4,369, dated May 2, 1871.

*To all whom it may concern:*

Be it known that I, CHARLES L. TUCKER, of the city of Chicago, in the county of Cook and State of Illinois, have invented a certain new and Improved Package for Lard; and I do hereby declare that the following is a full, clear, and exact description thereof, reference being had to the accompanying drawings making a part of this specification, in which—

Figure 4:
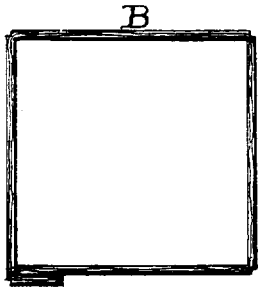
Figure 5:
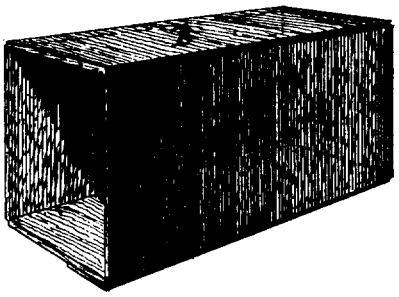

Figure 1 is a perspective view with a portion of the top removed; Fig. 2, a partial vertical section; Fig. 3, a perspective or isometric view of a case containing nine packages; Fig. 4, a cross-section; Fig. 5, a perspective view of the veneer tube, and Fig. 6 a longitudinal section of the tube with the bottom inserted.

Lard has been heretofore packed in tierces, barrels, kegs, tubs, and pails, and when so packed is subject to great loss from absorption and leakage. A large portion of families purchase it only in small quantities at a time, say from one to ten pounds. It is not practicable to make any of these packages so small as to contain only these limited quantities. These large packages standing open while the retailer is selling out of them, the lard is liable to become rancid; rats eat of, run over, and soil it; dirt and dust get onto it, thereby causing waste; and in warm weather it is liable to waste by dripping or running when either weighed or carried in open dishes. As heretofore handled it was an inconvenient and unprofitable article for the retail dealer. It was also sometimes packed in tin, but only to a limited extent, as tin is very expensive for small packages, is opened with difficulty when sealed, and is liable to impart a flavor to the lard. It was, therefore, a desideratum to have a package which would avoid all of these difficulties and be adapted to hold small quantities of lard for family use, for retailing and preserving without waste or injury, and so light and cheap as to cause no material addition to the cost of the lard to the consumer, and also to be tight enough to retain lard in all conditions, exclude air, dirt, &c., and strong enough to bear transportation. I accomplish this by selecting thin veneer wood as the material of which to form or construct the body or sides of a package, forming it into a tubular shape of angular cross-section, and securing the ends by a tight lap-joint which will resist melted lard, and by inserting within the tube at each end a thick piece of wood, closely fitting the body or sides, to which they are secured. By this construction the fragile veneer forming the sides is materially strengthened, its form is preserved, and all projections upon the outside, such as projecting heads, cover-rims, and the use of sliding covers, are avoided. By giving this package a lining, coating, or saturation of some material impervious to and not acted upon by melted or solidified lard, I prevent its running or percolating through the thin sides, and at the same time add an element of strength. By this construction and coating I make thin veneer wood suitable to receive and retain lard in any condition, thereby making veneer available for uses to which they were not heretofore adapted. By adding an exterior coating of metal-surfaced paper, I obtain an elegant finish, a good insulation, and a covering which prevents any grease that may get upon the exterior from disfiguring the package. I believe this special use of metal-surfaced or foil paper in connection with packages containing grease is novel, and it has a special value in this application, the cleanly appearance of the packages being important to their introduction and sale. It also deters vermin from attacking the packages.

To enable others skilled in the art to make and use my improved package, I will describe the same with reference to the drawings.

Figure 6:
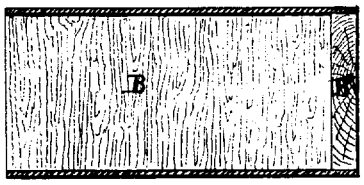

A represents the foil-paper covering; B, the body or sides of the package; B′, the lower end or head; C, the lining or saturation, (prepared paper being shown;) D, the upper head or end, and F the lard or other incased oleaginous material. A′ in Fig. 3 represents completed packages inclosed in an outer box, E, for transportation. In constructing my box or package, I make the body or sides B of what is known as veneer wood, of from one-eighteenth to one eighth of an inch in thickness, and bend them as shown in Figs. 4 and 5. I make the lap-joint tight by means of glue, cement, or tacks, or tacks with glue or cement. It is important that this joint or lap be made lard-tight, and to do this it is necessary that one end, at least, of the tube be open, so as to admit of giving the required pressure to glue or cement, or to clinch the tacks or brads, if they are used. The tubular body B can be formed with the end B′ in place, as shown at Fig. 6, or without it, as shown at Fig. 5; and when so formed B′ is inserted afterward, and in either case it is secured to B by tacks, glue, or other suitable means. The heads or ends B′ and D should be about one-fourth to three-eighths of an inch in thickness, and fit the body or sides closely.

When the head B′ is inserted and secured the box is ready for surfacing or saturating. For this purpose I use gum-arabic in solution. I prefer this, as it is impervious to and not acted upon by lard, and is also innoxious. It is applied to the box in any convenient manner. By this application of a surfacing or saturating material the pores and seams of the wood and small openings caused by imperfect construction are closed, waste from leakage is prevented, and the thin sides materially strengthened. I attain the same results by lining the veneer with paper or other suitable substance and applying the solution used to that; but when a paper lining is used, it should be applied to the veneer before bending it into form.

Other substances may be used for coating, surfacing, or saturating; but I prefer gum-arabic, as it is not only insoluble in oil, but is inodorous and perfectly harmless in case any of its particles become mixed with the lard.

In preparing this solution, a little glycerine, gelatine, or isinglass will be found advantageous in preventing cracking. The glycerine also acts as an antiseptic. When sufficiently dried the box is ready to be filled. The lard is drawn or poured in in a melted state at as low a temperature as will permit a ready flow. When the lard has cooled the top D is inserted, so as to leave a little space between it and the lard. It is then secured to the sides by tacks, glue, or other suitable means. I then cover the package with metallic-surfaced or foil paper, which is applied and held by means of glue, paste, or other adhesive material. This covering, in addition to the advantages before named, further strengthens the box and affords great protection against the action of heat upon the lard. Common paste or straw board may be used in constructing the sides of my package, but when used the tops and bottoms are made of the thick wood and inserted as with the veneer sides.

The boxes are made of various sizes, and are designed to hold one, three, five, seven, or ten pounds, but other sizes can be used. The thinness of the sides, however, will not permit of their being made of a much greater capacity than ten pounds. For a box calculated to hold one pound in its best form the interior dimensions are made four by two and one-half inches across and three inches deep. For ten pounds they are made six and three-fourths inches across and seven and one-half inches deep. The dimensions for other sizes can be readily determined.

I make my packages or boxes square or angular, but I do not confine myself to that form, as they may be made cylindrical upon the same principles and combine nearly all of the same advantages; but I prefer the angular form, because the boxes occupy less space when packed into cases for transportation, and as they have no projections upon the outside they support each other on all parts alike when so packed.

The package thus produced, in addition to the advantage of being adapted to retain lard, to hold it when melted, of being perfectly air-tight, light, strong, cheap, without projections, easily opened, neat and attractive in appearance, and avoiding waste, renders the use of light, thin, or fragile materials practicable for packing and transporting lard, brings lard to the consumer in perfect order, in small measured quantities, and without enhancing its cost.

What I claim as new, and desire to secure by Letters Patent, is—

1. A box made of veneer or pasteboard sides, shaped into a tubular form, and secured by a tight lap-joint, with thick top and bottom both inserted into such tube, substantially as described.

2. A box constructed as described, in combination with a coating, surfacing, saturating, or lining of a material impervious to and not acted upon by the lard, substantially as specified.

3. A box constructed as described, and coated, surfaced, saturated, or lined, as described, in combination with a metal-surfaced or foil paper covering, substantially as and for the purposes described.

4. The application or use of metal-surfaced or foil paper for covering oleaginous packages, constructed of wood, or wood and paper, substantially as and for the purposes specified.

5. The use of gum-arabic for surfacing or saturating lard-packages, and making them tight and non-absorbing, substantially as set forth.

6. As an improved article of manufacture, a small measured quantity of lard incased in a sealed wood or wood and paper package, substantially as specified.

CHARLES L. TUCKER.

Witnesses:
L. L. BOND,
R. H. ANDREWS.